US011616786B2

(12) United States Patent
Olesen et al.

(10) Patent No.: US 11,616,786 B2
(45) Date of Patent: *Mar. 28, 2023

(54) SYSTEM AND METHOD FOR PROCESSING COMPUTER INPUTS OVER A DATA COMMUNICATION NETWORK

(71) Applicant: RPR Group Holdings, LLC, Seattle, WA (US)

(72) Inventors: Marie B. V. Olesen, La Jolla, CA (US); Dana Fox, Edmonds, WA (US); David Evans, La Jolla, CA (US); April K. Linden, San Diego, CA (US); Eva K. Sheie, North Bend, WA (US); Aimee D. Ellingsen, Ashville, NC (US)

(73) Assignee: RPR Group Holdings, LLC, Seattle, WA (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/186,692

(22) Filed: Feb. 26, 2021

(65) Prior Publication Data

US 2021/0258319 A1    Aug. 19, 2021

Related U.S. Application Data

(63) Continuation of application No. 15/659,522, filed on Jul. 25, 2017, now Pat. No. 10,938,822, which is a
(Continued)

(51) Int. Cl.
*H04L 9/40* (2022.01)
*G06Q 30/0282* (2023.01)
*G06F 21/62* (2013.01)

(52) U.S. Cl.
CPC ........ *H04L 63/102* (2013.01); *G06F 21/6254* (2013.01); *G06Q 30/0282* (2013.01); *H04L 63/10* (2013.01); *G06F 2221/2111* (2013.01)

(58) Field of Classification Search
CPC ... H04L 63/102; H04L 63/10; G06F 21/6254; G06F 2221/2111; G06Q 30/0282
See application file for complete search history.

(56) References Cited

U.S. PATENT DOCUMENTS

| 7,720,705 B2 * | 5/2010 | Stein | G06Q 30/0203 705/7.32 |
|---|---|---|---|
| 8,745,733 B2 * | 6/2014 | Niemela | H04L 63/1416 726/22 |

(Continued)

*Primary Examiner* — Ghodrat Jamshidi
(74) *Attorney, Agent, or Firm* — Knobbe, Martens, Olson & Bear, LLP

(57) ABSTRACT

Various computers will communicate messages back and forth over a communication network. These communications may exchange various information. In one aspect, an apparatus for communicating data over a communication network may comprise a computer processor, a receiver, and a memory. The computer processor may generate a request for transmission to a first server via the communication network. The request may include a data inquiry for data about an authorized user of a communication device. The computer processor may also generate a communication message for transmission to the authorized user with a prompt to provide user data via the communication device. The receiver may receive a response from the first server and user data from the communication device. The computer processor may further format the user data and generate a dynamic value based on the formatted response for display.

20 Claims, 20 Drawing Sheets

Related U.S. Application Data continuation of application No. 14/180,340, filed on Feb. 13, 2014, now abandoned.

(60) Provisional application No. 61/765,648, filed on Feb. 15, 2013.

(56) References Cited

U.S. PATENT DOCUMENTS

| | | | |
|---|---|---|---|
| 2001/0047290 A1* | 11/2001 | Petras | G06F 16/38 707/E17.093 |
| 2002/0062248 A1* | 5/2002 | Sakurai | G06Q 30/02 705/14.19 |
| 2009/0254989 A1* | 10/2009 | Achan | H04L 63/1441 703/21 |
| 2012/0084859 A1* | 4/2012 | Radinsky | G06F 21/56 707/E17.046 |
| 2012/0278253 A1* | 11/2012 | Gahlot | G06Q 30/0201 705/347 |
| 2016/0344765 A1* | 11/2016 | Shiell | H04L 63/1458 |
| 2018/0359223 A1* | 12/2018 | Maier | H04L 63/101 |

\* cited by examiner

How to talk to patients about the survey

- "Dr. _____ and the rest of our staff are committed to patient service and providing the highest level of patient care. We have partnered with a 3rd party vendor, RealPatientRatings.com to seuvey all of out patients. You will receive the invitation within the next 10 days after consultation and 2 months after surgery. All of your comments are anonymous.

- Your feedback and insight helps our practice and future patients. Not only are we improving by your feedback but you help future patients make the best decision when they are thinking about plastic surgery.

- To thank you for your time, you receive a $25 discount on any purchase of $100 or more.

REALPATIENTRATINGS

FIG. 8

HIPAA Business Associate

- Allows you to disclose protected health information
- We are legally bound to use the information only for the purposes for which it was engaged
- We legally agree to safeguard the information from misuse

PLASTIC SURGERY

Dear Valued Patient {LAST_NAME},

You recently had a consultation with our practice and we'd like to know how that experience went.

Real Patient Ratings, an independent third party research company, surveys every patient after consultation on our behalf. Our surveys are anonymous unless you indicate that you would like to hear from me or one of my staff.

The survey will take approximately 4-5 minutes to complete. Please help us by clicking on the following link from your smartphone or computer.

Click here to start the survey

After completing the survey, you will receive a $25 gift certificate for any purchase over $100. Please print the coupon at the end of the survey and call or bring to our office to redeem.

We thank you in advance for your input.

Sincerely,

*If you have already scheduledsurgery, you will have an opportunity to take a different survey approximately eight weeks after your procedure has been completed. This survey is designed to obtain feedback about your consultation.*

REALPATIENTRATINGS

FIG. 10

This is not just any survey!

REALPATIENTRATINGS

PATIENT SATISFACTION SURVEY

Thank you so much for taking this brief online survey providing feedback to your plastic surgeon.

Your plastic surgeon greatly values your opinion and has asked Real Patient Ratings to gather your feedback.

Real honest patient feedback is invaluable to plastic surgeons who are dedicated to making patient experiences the best they can be. That's why your plastic surgeon is asking you to take this survey.

Any information we collect will be used strictly for evaluating the quality of care you received and identifying areas for improvement. No one will contact your unless you expressly request communication. To review our Web Survey Privacy Statement, click here.

Your participation in the survey is voluntary.

Your opinions are ANONYMOUS, unless you choose to share your name

Thank you,

Real PatientRatings.com

REALPATIENTRATINGS

*FIG. 11*

REALPATIENTRATINGS

You have 1 new patient comments, click here to review them,
Your username is [  ] New Comments:

7/11/2012
★★★★★ - Breast surgery  *consultation*
I was highly satisfied with my experience due to the fact that I was extremely nervous, no clue why. The nurses, staff, as well as the surgeon made me feel so much better, they understood exactly what I wanted. Everyone was very friendly and kind to me whick I really loved, after leaving my consultation I went around to acouple different consultations with different doctors but no one could have compared. I just felt so comfortable that I decided to have my surgery done with you guys. It was a great choice

REALPATIENTRATINGS

Transparent Feed

Home - Find a Top Round Surgeon

_____ MD member since 01/01/2012

(4.62) ★★★★★

Based on 26 Surgery Reviews ○

Plastic Surgery www.plasticsurgery.com

| Surgery Reviews | Google Reviews | Surgery Reviews | Procedures |

1/27/2013
★★★★★ - Breast Augmentation
Dr. _____ and his staff were very professional and attentive to my concerns. I never felt rushed to make a decision or pressured in any way, and that made me feel comfortable. Dr _____ has a friendly, confident manner and came recommended, so I felt assured that I was in good hands.

12/11/2012
★★★★★ - Breast Augmentation
Beautiful, natural-looking breasts. Fast recovery. Dr _____ did an outstanding job.

12/5/2012
★★★★★ - Breast Augmentation
Dr. _____ is such a wonderful and honest plastic surgeon. I felt very comfortable scheduling my breast augmentation and lift after my consultation. He listened to me and answered all my questions I had. I absolutely love the results!!! Dr _____ is Amazing and I will definitely recommend him to family and friends!

1/27/2013
★★★★★ - Breast Augmentation
Post op instructions differed between what office provided and what surgical center provided. More consistent post op instructions would have been helpful.

REALPATIENTRATINGS

*FIG. 15*

Real patients. Real reviews. Real experiences you can rely on.
*Helping you make informed decisions based on 100% authentic doctor and procedure reviews.*

— 201

Doctor specialty:
[Cosmetic ▼]
Vision
Dental
Weight loss

AJAX filters in real time to show # of results — 202

Location:
[🔍 City or ZIP code]
[within 50 miles ▼]

Keywords:
[🔍 filter doctor profiles by keywords]

Kinds of liposuction, kinds of facelifts, breast augmentation approaches

— 203

NARROW BY: Inclusive can choose multiples
[Languages ▼]

PROCEDURE OPTIONS:
[Area of concern ▼] [Procedure ▼] [Technique ▼] [Brand ▼] [Product ▼] [Surgical or Non-Surgical]

Manufactor or device brand name alphabetical

SkinMedica skin care lines detail

Sort by:
[Alphabetical ▼]
Highest overall rating
Overall satisfaction - experience
Overall satisfaction - procedure result
Overall satisfaction - doctor
Helpfulness & friendliness of staff
Doctor's bedside manner
Coordinated communication & education
Post-procedure follow up and care
Reasonable wait time
Cleanliness and atmosphere of facility
Fees and payment options can choose

Specialty
☐ Plastic Surgery
☐ Facial Plastic Surgery
☐ General Surgery
☐ Dermatology Surgery
☐ Dermatology

Facility
☐ Office-based (All)
☐ Office-based (Accredited)
☐ Hospital
☐ Surgery Center

Offers
☐ Local anesthesia
☐ Monitored anesthesia
☐ General anesthesia

Financial
☐ Offers payment plans
☐ Lists procedure prices online
☐ Accepts CareCredit card
☐ Military discount
☐ Cash discount

Demographics
☐ Male provider
☐ Female provider

— 207

First Last, MD
Example Practice Name
(4.85) ★★★★★ 265 ratings / 212 reviews

First Last, MD
Example Practice Name
(4.77) ★★★★★ 294 ratings / 243 reviews

First Last, MD
Example Practice Name
(4.70) ★★★★★ 105 ratings / 80 reviews

First Last, MD
Example Practice Name
(4.65) ★★★★★ 200 ratings / 156 reviews

First Last, MD
Example Practice Name
(4.60) ★★★★★ 70 ratings / 42 reviews

First Last, MD
Example Practice Name
(4.55) ★★★★★ 155 ratings / 114 reviews

Real patients. Real reviews. Real experiences you can rely on.
Helping you make informed decisions based on 100% authentic doctor and procedure reviews. — 209

Doctor specialty:

[ Cosmetic ▼ ]

Location:                                                      Keywords:

[ 🔍 City or ZIP code ]                                         [ 🔍 filter doctor profiles by keywords ]

[ within 50 miles ▼ ]
                                                                AJAX filters in real time to show #
                                                                           of results NARROW BY:              PROCEDURE OPTIONS:                                    Date range [ / / ] 📅 to [ / / ] 📅

Avg. patient rating
☐ ★★★★★
☐ ★★★★       214        [Area of concern ▼] [Procedure ▼]  [Technique ▼]   [Brand ▼]        [Product ▼]
☐ ★★★                                                                                                    212
☐ ★★                    Sort by:                     Kinds of           Manufacturer or   SkinMedica skin
☐ ★                     [ Highest rating        ▼ ] liposuction, kinds   device brand      care lines detail
                         Lowest rating                of facelifts,         name
REVIEWER CHARACTERISTICS Newest to oldest               breast            alphabetical
Patient age range        Oldest to newest             augmentation
☐ under 18                                             approaches
☐ age 18-24                                      215
☐ age 25 to 34          2/9/2014  ★★★★★
☐ age 35 to 49          First Last, MD - Breast Revision
☐ age 50 to 64          Dr. was very realistic with me regarding what outcome I could expect. He used Strottice to correct capular contractive
☐ age 65 and over       and everything went very well. I'm 3 months post op and doing great. Wish I had done it sooner.

Gender                  2/9/2014  ★★★★★
☐ Female                First Last, MD - Tummy Tuck
☐ Male                  I like that fact that the Dr. gave his private cell numbers of both he and his staff so I could reach him after office hours if
                        need be. They showed care and compassion. The only negative thing I would say is that they need to correspond with
Ethnicity               the discharge staff at the hospital because he thought I had been given some instructions and what medications had
☐ African American or Black  been administered in the hospital, which I did not in fact receive.
☐ Asian/Pacific Islander
☐ Latino or Hispanic    2/8/2014  ★★★★★
☐ Pacific Islander or Hawaiian  First Last, MD - Breast reconstruction
☐ White or Coucasian    Dr. and his staff are professional and caring. They always take time to answer any questions or concerns that I have,
☐ Native American or Akiut  whether in person or over the phone. Office visits are very efficient and I am please with the outcome of my surgery.

Level of education:     2/8/2014  ★★★★★
☐ 8th grade or less     First Last, MD - Tummy Tuck
☐ less than high school  The entire staff is very friendly and helpful. They answered a phone call immediately when I had a concern during
☐ High school diploma or equivalent  recovery. She is supportive and informative. The patient coordinator was thorough in her information about the procedure
☐ Some college or 2-year degree  and costs. I appreciated Dr's soft spoken approach. He answered all of my questions and never appeared rushed
☐ Bachelor's degree     2/8/2014  ★★★★★
☐ Master's degree or higher  First Last, MD - Mommy Makeover (Breast + Body)
                        Love the Dr and staff. Results great!!!

2/8/2014  ★★★★
Annual household income First Last, MD - Breast reconstruction
☐ Less thank $20,000    Dr. and his staff were wonderful from the very first visit and continue to be friendly and professional. They kept me well
☐ $20,000 to $34,999    informed the entire time. My procedure looks wonderful and gets better each day. The Dr had a great repot with the
☐ $35,000 to $49,999    medical staff at the off site surgical facility, so that it felt like more of his team than an outside facility and staff were
☐ $50,000 to $74,999    takiing care of my. Overall I had a wonderful experience and would and do highly recommend Dr and his staff!
☐ $75,000 to $99,999    2/8/2014  ★★★★★
☐ $100,000 to $124,999  First Last, MD - Breast reconstruction
☐ $125,000 to $149,999  Dr. and his staff were very caring and gave me a lot of emotional support during all my procedures.
☐ $150,000 to $199,999
                        2/8/2014  ★★★★★
                        First Last, MD - Liposuction
                216

*FIG. 19*

Real patients. Real reviews. Real experiences you can rely on.
Helping you make informed decisions based on 100% authentic doctor and procedure reviews. — 209

Doctor specialty:
[Cosmetic ▼]

Location:
[🔍 City]
[within 50 miles ▼]

Keywords: — 221
[🔍 (emotional)]
AJAX filters in real time to show # of results

Date range [ / / ] 📅 to [ / / ] 📅

NARROW BY:

Avg. patient rating
☐ ★★★★★
☐ ★★★★
☐ ★★★
☐ ★★
☐ ★

Patient age range
☐ under 18
☐ age 18-24
☐ age 25 to 34
☐ age 35 to 49
☐ age 50 to 64
☐ age 65 and over Male/Female ?
☐ Female
☐ Male Ethnicity
☐ African American or Black
☐ Asian/Pacific Islander
☐ Latino or Hispanic
☐ Pacific Islander or Hawaiian
☐ White or Coucasian
☐ Native American or Akiut Level of education:
☐ 8th grade or less
☐ less than high school
☐ High school diploma or equivalent
☐ Some college or 2-year degree
☐ Bachelor's degree
☐ Master's degree or higher Annual household income
☐ Less thank $20,000
☐ $20,000 to $34,999
☐ $35,000 to $49,999
☐ $50,000 to $74,999
☐ $75,000 to $99,999
☐ $100,000 to under $124,999
☐ $125,000 to $149,999
☐ $150,000 to $199,999
☐ $200,000 or more

PROCEDURE OPTIONS:

[Area of concern ▼] [Procedure ▼] [Technique ▼] [Brand ▼] [Product ▼] ◄
— 212

Sort by:
[Highest rating ▼]
Newest to oldest
Oldest to newest

Kinds of liposuction, kinds of facelifts, breast augmentation approaches

Manufacturer or device brand name alphabetical

SkinMedica skin care lines detail

— 227

Dr. First Last
12/20/2013 - Face Lift ★★★★★
All of the expectations were met, including who, (emotional) and physical issues that may occur. The overall atmosphere is kind, gentle.

Dr. First Last
12/18/2013 - Other ★★★★★
Dr. and his staff are the best! All of the expectations were met, including who, (emotional) and physical issues that Dr. First Last
12/13/2013 - Breast Augmentation ★★★
Provided me with education material, and also simply provided me with (emotional) support. This was an uncomfortable situation for me, because I have lacked Dr. First Last
12/11/2013 - Face Lift ★★★★★
They cared about not only the physical, but my mental and (emotional) well-being as well. The Dr. and all his staff made me feel so important and cared.

Dr. First Last
12/9/2013 - Liposuction ★★★★
Dr. went above and beyond, in my opinion, regarding my post-surgical medical and (emotional) well-being. And I LOVE the results.

Dr. First Last
12/9/2013 - Liposuction ★★★★
Patient when through the pain and (emotional) distress to have no visible results after attempted local fix.

SYSTEM AND METHOD FOR PROCESSING COMPUTER INPUTS OVER A DATA COMMUNICATION NETWORK

FIELD OF THE INVENTION

The present invention relates in general to a method for providing consumer ratings. It more particularly relates to a method for providing more accurate and trustworthy ratings for advising others such as the public in general concerning a variety of goods and/or services.

DESCRIPTION OF THE RELATED ART

This section describes the background art of the disclosed embodiment of the present invention. There is no intention, either express or implied, that the background art discussed in this section legally constitutes prior art.

Modernly, providers of goods and services oftentimes promote their products and services on websites. The providers will frequently request reviews and surveys pertaining to their products and services.

However, frequently the reviews and survey results are not entirely trustworthy. In this regard, all too frequently competitors or others may respond in a negative manner. Thus, when the provider publishes on its own website the results of the surveys and reviews, the results may not always be taken very seriously by the general public seeking to acquire the goods and/or services from the provider. The general public may be adversely affected by the false responses and thus tend not to purchase the goods or services from the provider. Also, when the provider receives substantially all raving reviews and/or ratings, the potential consumer may think that the reviews are not authentic or have been unfairly selected by the provider who may have deliberately eliminated adverse or unfavorable reviews. As a result, the potential consumer may not be persuaded to purchase the offered goods or services, or otherwise ignore the reviews entirely.

Therefore, it would be highly desirable to have a new and improved methods and system for providing more accurate and trustworthy ratings for goods or services.

Further drawbacks to conventional rating systems by providers of goods and/or services relate to the fact that generalized ratings of the providers' cells may be misleading. Typically, a provider will have a variety of different types and kinds of services and/or products. Therefore a rating for a provider may not be representative of all of its services and/or products. Some of the products and/or services may be of higher quality than other ones of the products and/or services being offered by a given provider. Therefore, a rating for a given provider may not be sufficient information for a consumer because it does not pertain to each and every one of the goods and/or services offered by a given provider.

BRIEF DESCRIPTION OF THE DRAWINGS

In order to better understand the invention and to see how the same may be carried out in practice, non-limiting preferred embodiments will now be described with reference to the accompanying drawings, in which:

FIGS. 8 and 9 are tables useful in understanding the embodiment of FIG. 2;

FIGS. 10 through 15 are screen shots utilized in connection with the method carried out by the system of FIG. 2;

FIGS. 18, 19 and 20 are screenshots utilized in connection with other features of embodiments carried out by the system of FIG. 2.

DETAILED DESCRIPTION OF THE PREFERRED EMBODIMENT

Figure 1:
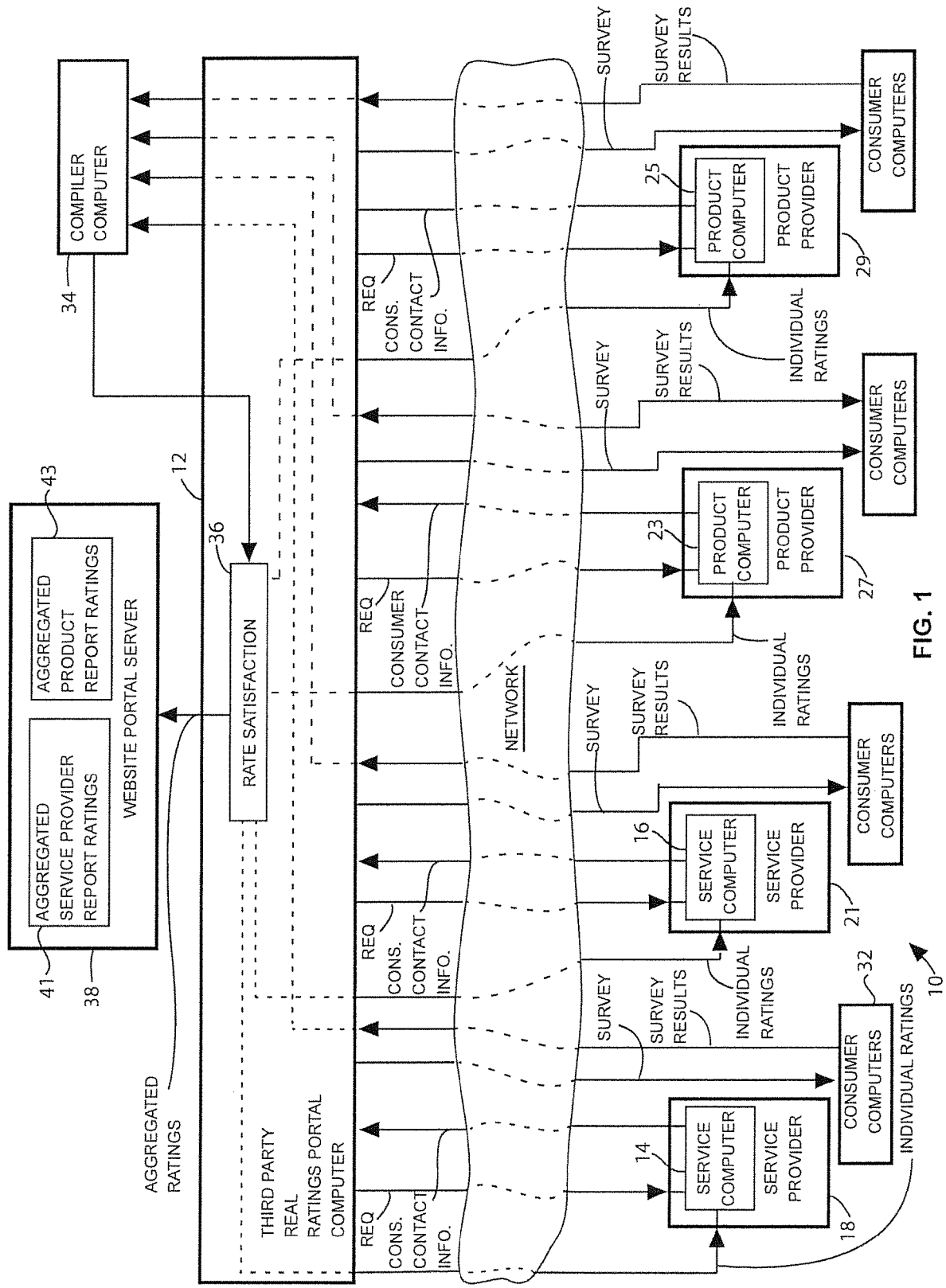
FIG. 1. is a block diagram view of a system, which is constructed in accordance with an embodiment.
Figure 2:
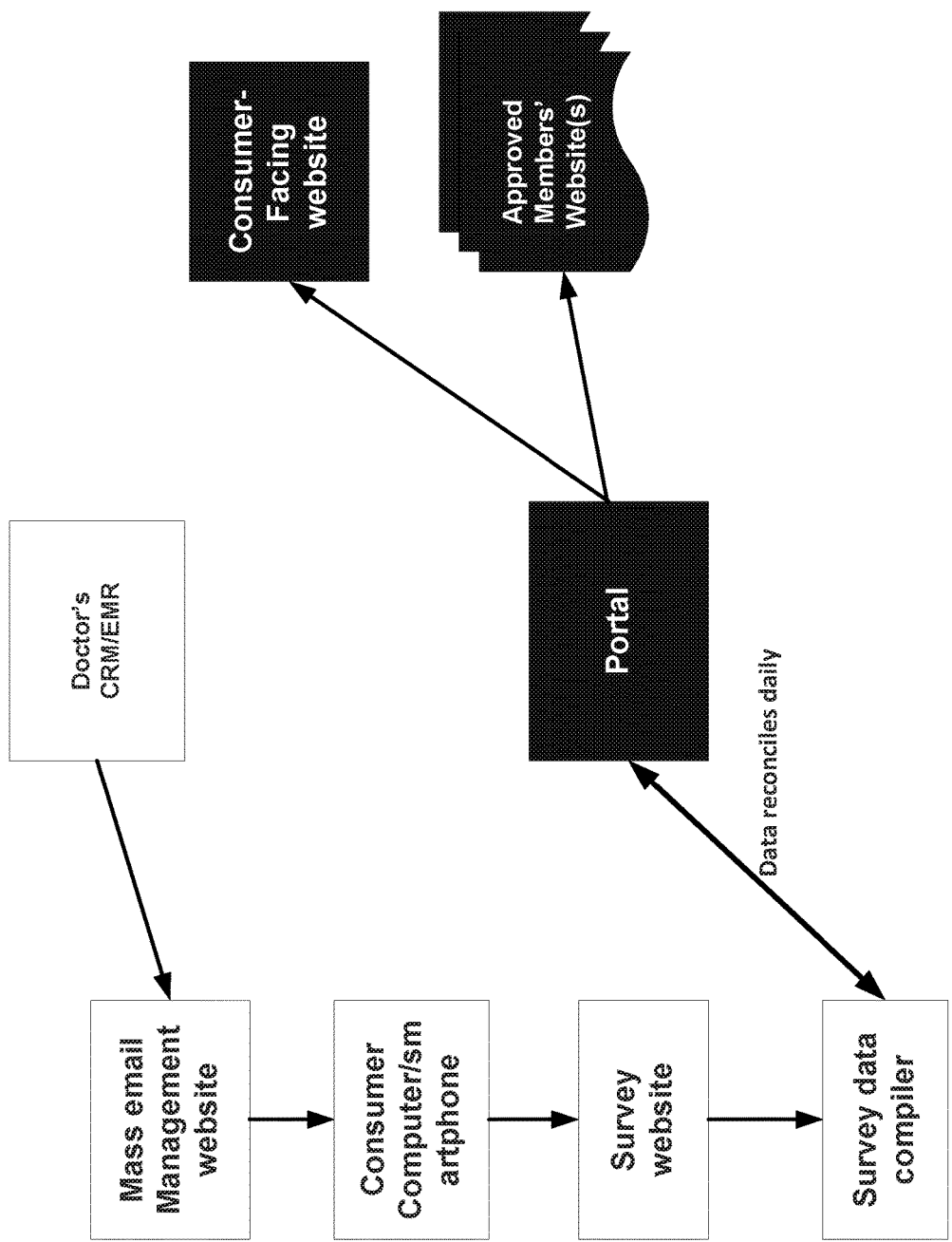
FIG. 2 is a block diagram view of another system, which is constructed in accordance with another embodiment.

The present patent application incorporates by reference, in their entireties, U.S. application Ser. No. 14/180,340, filed Feb. 13, 2014, and U.S. application Ser. No. 14/180,345, filed Feb. 13, 2014.

It will be readily understood that the components of the embodiments as generally described and illustrated in the drawings herein, could be arranged and designed in a wide variety of different configurations. Thus, the following more detailed description of certain ones of the embodiments of the system, components and method of the present invention, as represented in the drawings, is not intended to limit the scope of the invention, as claimed, but is merely representative of the embodiment of the invention.

According to certain embodiments, a method is provided to create and display consumer ratings in a more trustworthy and accurate manner. The ratings are generated by obtaining contact information from actual consumers by an independent third-party rating service, and then sending surveys to the actual consumers only and not to the general public or the providers. In this manner, the general public, as well as the goods and service providers, are not permitted to respond to the surveys, only actual consumers of the goods and/or services. Therefore fake or unreliable responses are totally eliminated or greatly reduced.

A technique of providing consumer ratings relates to the requesting from providers, consumer contact information for consumers receiving goods and/or services from the providers by an independent third-party rating service. In response to receiving the consumer contact information, sending of survey questionnaires to the consumers may then be accomplished. The independent third-party rating service may then cause the compiling of the survey results, and then may display on its third-party website the consumer ratings for the actual consumers who have received the goods and/or services. The third-party rating service may supply to the provider computers the ratings or reviews from the surveyed consumers. Sub-categories may also be searched.

Referring now to the drawings and more particularly to FIG. 1 thereof, there is shown a consumer rating system 10, which is constructed in accordance with an embodiment. The system 10 includes a third party real ratings portal computer 12, which may communicate with a group of service provider computers such as service computer 14 and service computer 16 for the respective service providers 18 and 21. It should be understood that the service providers may be in the same field such as the cosmetic surgery field, or may be in diverse independent and distinct service fields which are totally unrelated to one another.

Similarly, the third party real ratings portal computer 12 may communicate with a group of product computers such as product computer 23 and product computer 25 utilized by respective product providers 27 and 29. The products associated with the product providers 27 and 29 may also be in the same field, or may be totally diverse independent and distinct products.

Considering now the method of utilizing the system 10, the third party real ratings portal computer 12 sends requests signals to the various different service and product computers, such as the service computer 14, to request consumer contact information. The service and product computers then return the consumer contact information for the service and product providers for actual consumers only.

Surveys are then sent via emails or other suitable communication techniques to various different consumer computers such as the consumer computers 32 owned by consumers of services rendered by the service provider 18. The consumers then respond to the surveys and send them back via emails or other suitable communication techniques to the real ratings portal computer 12, which then conveys the raw data to a compiler computer 34, which then compiles the raw data and formats it. A great satisfaction module 36 of the third party real ratings portal computer 12 then generates ratings such as star ratings.

The ratings are then sent to a website portal server 38 which then publishes dynamically as the surveys are collected. In this regard, the website portal server 38 may publish both service provider ratings 41 and product provider ratings 43. For example, the ratings such as star ratings may be published on the website generated by the server 38 on a per provider or per group basis, or on a per procedure or task or product basis.

Also, the portal computer 12 also may provide ratings as well as other information to various service and product computers such as the service computer 14 so that the service and product providers such as the service provider 18 may display individual ratings and/or reviews on the provider's own website. For example, the individual providers may provide information concerning individual practitioners, groups or companies.

In the preferred embodiments, the surveys are maintained anonymously to preserve confidentiality. However, the consumer may choose to provide a review as part of the information supplied to the portal computer 12.

Referring now to FIGS. 2 through 15, there is shown a specific embodiment of the system and method of FIG. 1. The system and method of FIGS. 2 through 15 relate in general to a group of service providers in the cosmetic surgery field.

Figure 16:
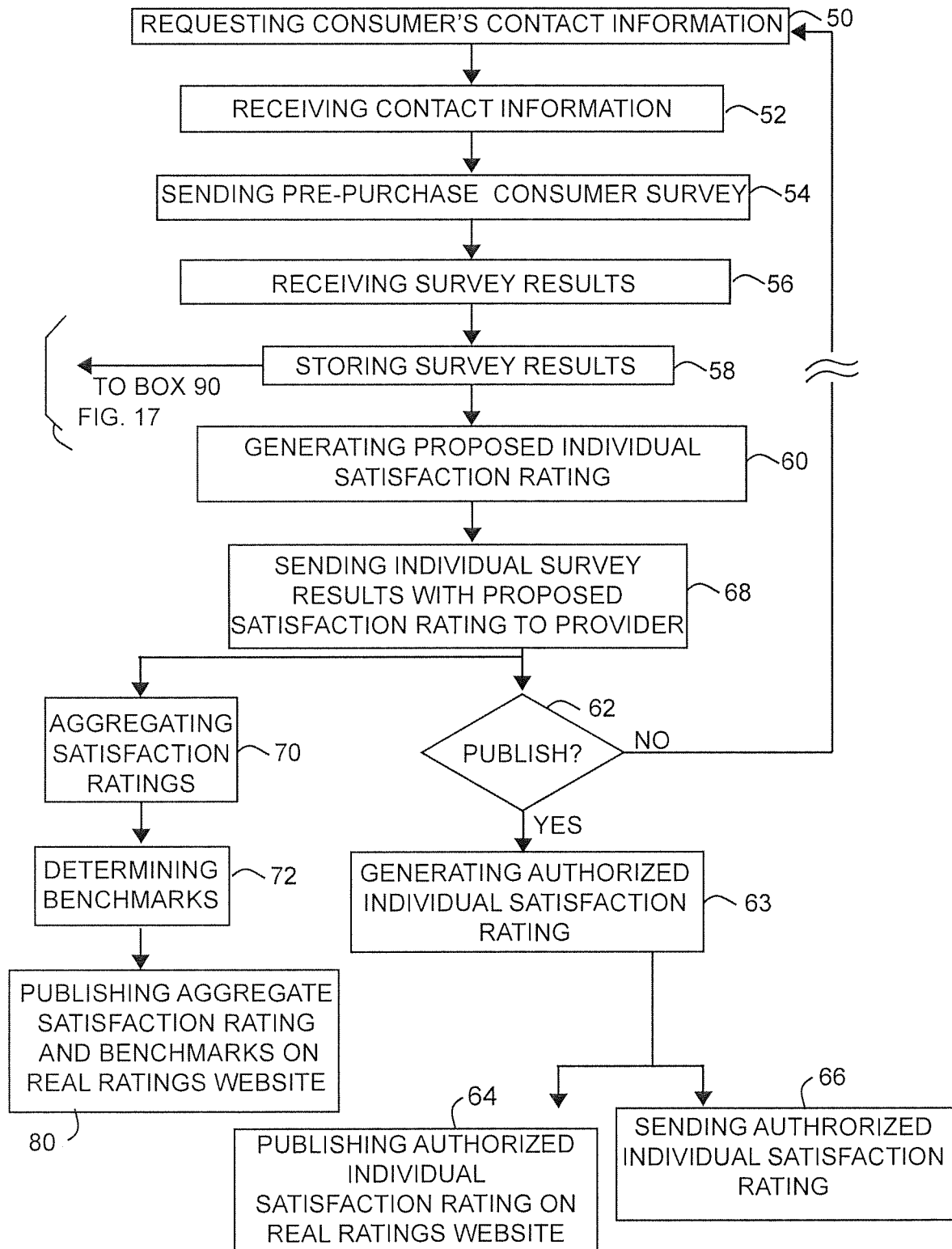
FIGS. 16 and 17 are flow charts of the method for providing consumer ratings using the system of FIG. 1.
Figure 17:
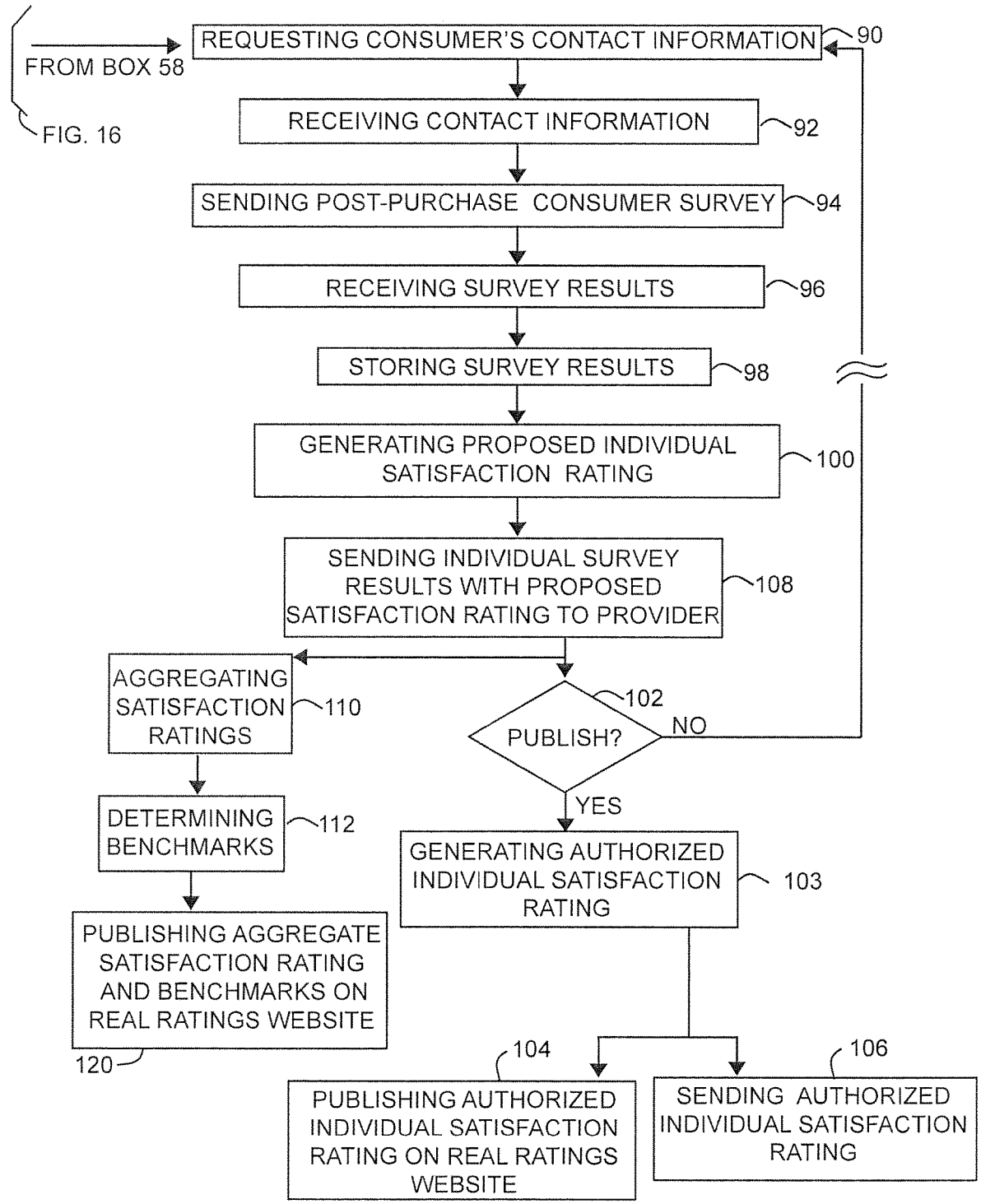

Referring now to FIGS. 16 and 17, there is shown a generalized method for providing consumer ratings using the system of FIG. 1. At box 50, the third party real ratings computer 12 requests consumer contact information from the service provider computer 14. This same generalized method also applies to requests for consumer contact information from the service provider computer 16, the product provider computer 23 and the product provider computer 25. This is contact information from actual consumers who have received a pre-purchase consultation from the service provider 18. For example, the actual consumers might be potential patients who have received a pre-procedure consultation from a physician for a medical treatment such as cosmetic nose surgery. This generalized method also applies to pre-purchase consultations from the service provider 21, the product provider 27 and the product provider 29. At box 52, the service provider computer 14 then returns the consumer contact information for the service provider 18 for actual consumers only.

At box 54, surveys are sent via emails or other suitable communication techniques to various different consumer computers 32 owned by consumers of services rendered by the service provider 18. In the example, these surveys may include questions related to topics such as the patient's overall assessment of the doctor or the patient's likelihood to engage the doctor to actually perform the procedure. The actual consumers then respond to the surveys and send them back via emails or other suitable communication techniques to the real ratings portal computer 12 at box 56. The real ratings portal computer 12 stores the survey results at box 58 by conveying the raw data to the compiler computer 34, which compiles and formats the raw data. Additionally, at box 58, the real ratings portal computer schedules a follow-up post-procedure survey for the consumers who participated in the pre-procedure survey. At box 60, a great satisfaction module 36 of the third party real ratings portal computer 12 then generates a proposed individual satisfaction rating, such as a star rating.

At box 68, the third party real ratings portal computer 12 sends the proposed individual satisfaction rating to the service provider computer 14. At box 62, the service provider 18 reviews and then decides whether to publish the proposed individual satisfaction rating. If the service provider 18 decides not to publish the proposed individual satisfaction rating, then the rating will not be published and the service provider may then review its procedures with this particular actual consumer, or additionally, with other actual consumers in order to try and improve the rating of the service provider 18.

If the service provider 18 decides to publish the rating, the third party real ratings portal computer 12 then generates an authorized individual satisfaction rating at box 63. Then, the third party real ratings portal computer 12 publishes the authorized individual satisfaction rating on the website portal server 38 at box 64. In addition, at box 66, the third party real ratings portal computer 12 sends the authorized individual satisfaction rating to the service provider computer 14 for use and/or publication by the service provider 18 on the service provider's website (not shown).

Once the real ratings portal computer 12 has created proposed individual satisfaction ratings for multiple service providers, such as service provider 18 and service provider 21, then the real ratings portal computer 12 begins to generate aggregate satisfaction ratings at box 70. The real ratings portal computer 12 may also determine benchmarks at box 72. These benchmarks may compare aggregate satisfaction ratings for various categories or geographical areas, such as the western or the northeastern United States. Finally, the real ratings portal computer 12 may publish the aggregate satisfaction ratings and/or the benchmarks based on the pre-purchase surveys provided by actual consumers on the website portal server 38 at box 80.

As described above at box 58, if a consumer who was identified by the real ratings portal computer 12 for participating in the pre-procedure survey and scheduled to receive a follow-up post-procedure survey, the real ratings portal computer 12 then requests updated consumer contact information from the service provider computer 14 at box 90. This is contact information from actual consumers who purchased a service from the service provider 18. For example, the actual consumers might be patients who have received a procedure such as cosmetic nose surgery from a physician. This generalized method also applies to pre-purchase consultations from the service provider 21, the product provider 27 and the product provider 29. At box 92, the service provider computer 14 then returns the consumer contact information for the service provider 18 for actual consumers only.

At box 94, surveys are sent via emails or other suitable communication techniques to various different consumer computers 32 owned by consumers of services rendered by the service provider 18. In the example, these surveys may include questions related to topics such as the patient's overall assessment of the doctor or the patient's likelihood to engage the doctor to perform a different procedure. The actual consumers then respond to the surveys and send them back via emails or other suitable communication techniques to the real ratings portal computer 12 at box 96. The real ratings portal computer 12 stores the survey results at box 98 by conveying the raw data to the compiler computer 34, which compiles and formats the raw data. Additionally, at box 58, the real ratings portal computer schedules a follow-up post-procedure survey for the consumers who participated in the pre-procedure survey. At box 100, a great satisfaction module 36 of the third party real ratings portal computer 12 then generates a proposed individual satisfaction rating, such as star rating.

At box 108, the third party real ratings portal computer 12 sends the proposed individual satisfaction rating to the service provider computer 14. At box 102, the service provider 18 reviews and then decides whether to publish the proposed individual satisfaction rating. If the service provider 18 decides not to publish the proposed individual satisfaction rating, then the rating will not be published and the service provider may then review his procedures with this particular actual consumer, or additionally, with other actual consumers in order to try and improve the service provider's 18 rating.

If the service provider 18 decides to publish the rating, the third party real ratings portal computer 12 then generates an authorized individual satisfaction rating at box 103. Then, the third party real ratings portal computer 12 publishes the authorized individual satisfaction rating on the website portal server 38 at box 104.

In addition, at box 106, the third party real ratings portal computer 12 sends the authorized individual satisfaction rating to the service provider computer 14 for use and/or publication by the service provider 18 on the service provider's website (not shown).

Once the real ratings portal computer 12 has created proposed individual satisfaction ratings for multiple service providers, such as service provider 18 and service provider 21, then the real ratings portal computer 12 begins to generate aggregate satisfaction ratings at box 110. The real ratings portal computer 12 may also determine benchmarks at box 112. These benchmarks may compare aggregate satisfaction ratings for various categories or geographical areas, such as the western or the northeastern United States. Finally, the real ratings portal computer 12 may publish the aggregate satisfaction ratings and/or the benchmarks based on the pre-purchase surveys provided by actual consumers on the website portal server 38 at box 120.

Figure 3:
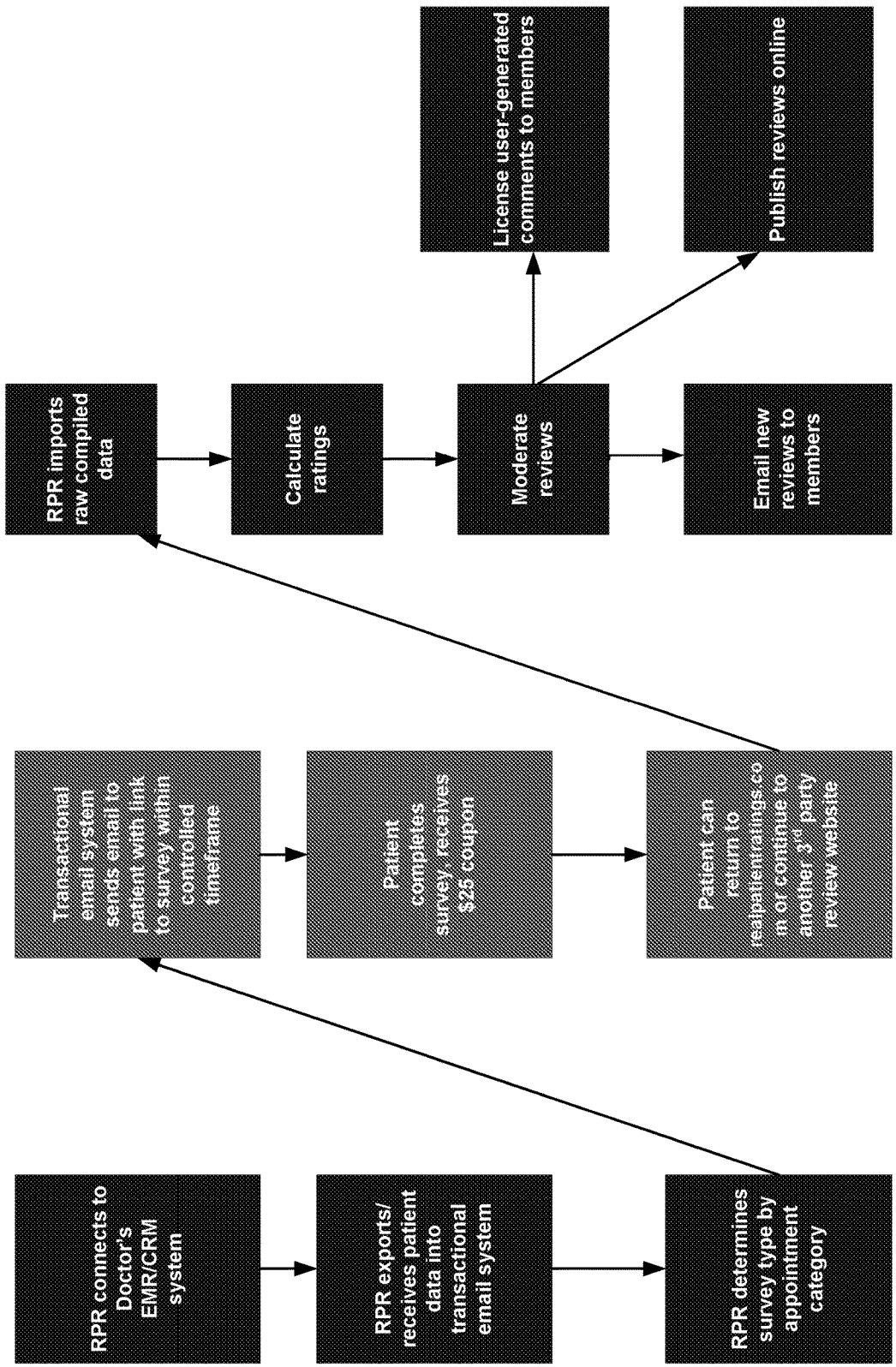
FIG. 3 is a flowchart diagram of a partially manual method carried out by the system of FIG. 2.
Figure 4:
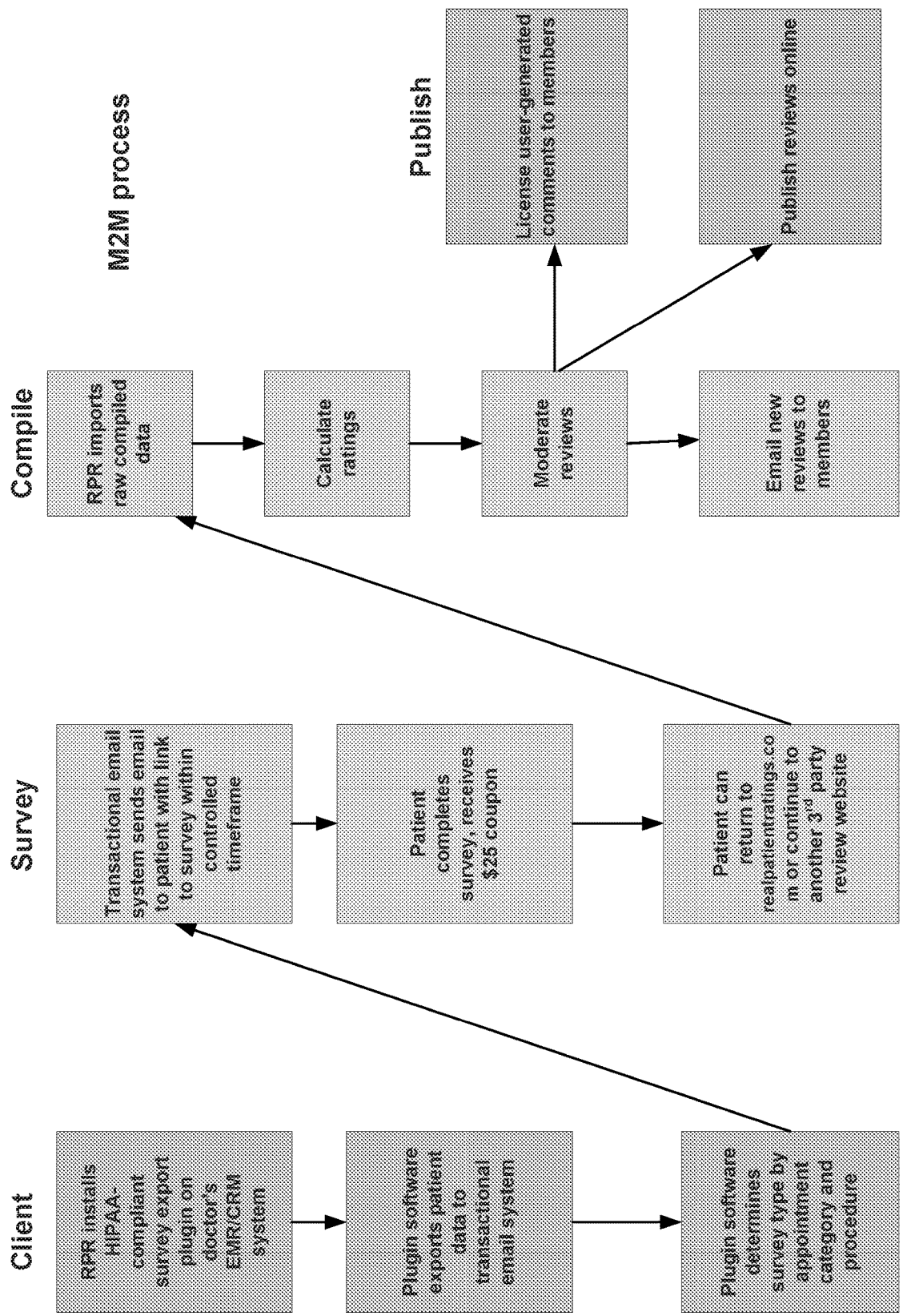
FIG. 4 is a flowchart diagram of a more fully automatic method for carrying out the system of FIG. 2.

FIG. 3 illustrates a more specific example of a flowchart of a manual process in accordance with the generalized process illustrated in the flowcharts of FIGS. 16 and 17 of the drawings. FIG. 4 is a more specific example of a flowchart of a manufacturer to manufacturer process in accordance with the flowcharts of FIGS. 16 and 17 of the drawings.

Figure 5:
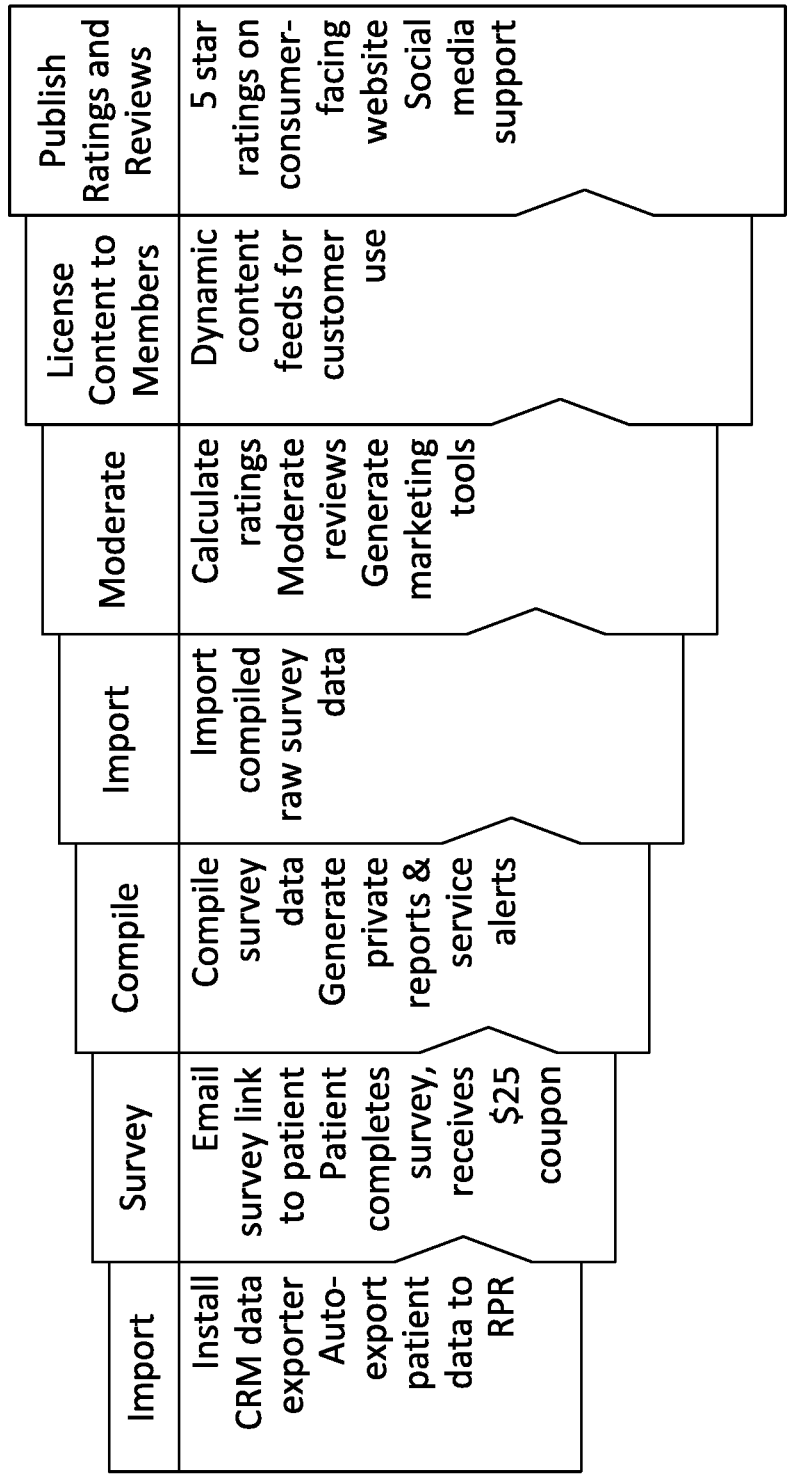
FIGS. 5 and 6 are flow diagrams to illustrate the method for carrying out the system of FIG. 2.
Figure 6:
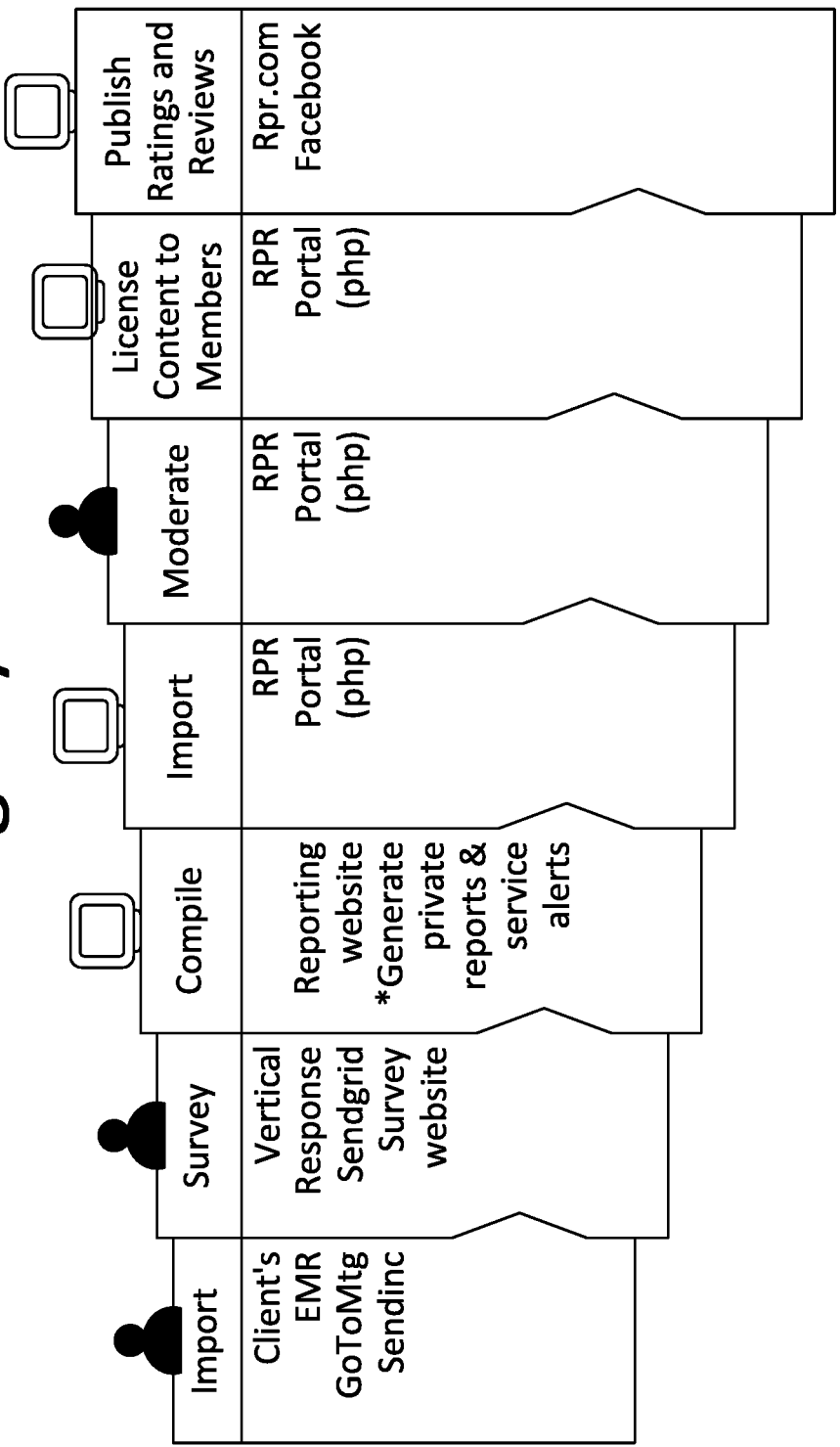
Figure 7:
FIG. 7 is a screen shot utilized in connection with the method carried out by the system of FIG. 2.
Figure 9:

FIG. 5 is a diagram similar to the flowchart diagram of FIG. 3 illustrating the process according to the embodiments described herein. Similarly, FIG. 6 is a diagram which corresponds to the system 10 of FIG. 1. FIGS. 7 through 15 are screen shot illustrations generated by the third party real ratings portal computer 12 for display on consumer computers such as the consumer computers 32. FIG. 7 is an introductory screen shot concerning the rating service of the present embodiment. FIGS. 8 and 9 disclose examples of introductory screen shots inviting the consumer, in present example a patient, to provide survey information. FIG. 10 is a screen shot of a personalized letter to a patient who has decided to partake in the survey. It includes a link Click here to start the survey. By clicking on the link, the consumer is taken to the survey for enabling the consumer to take the survey.

Figure 13:
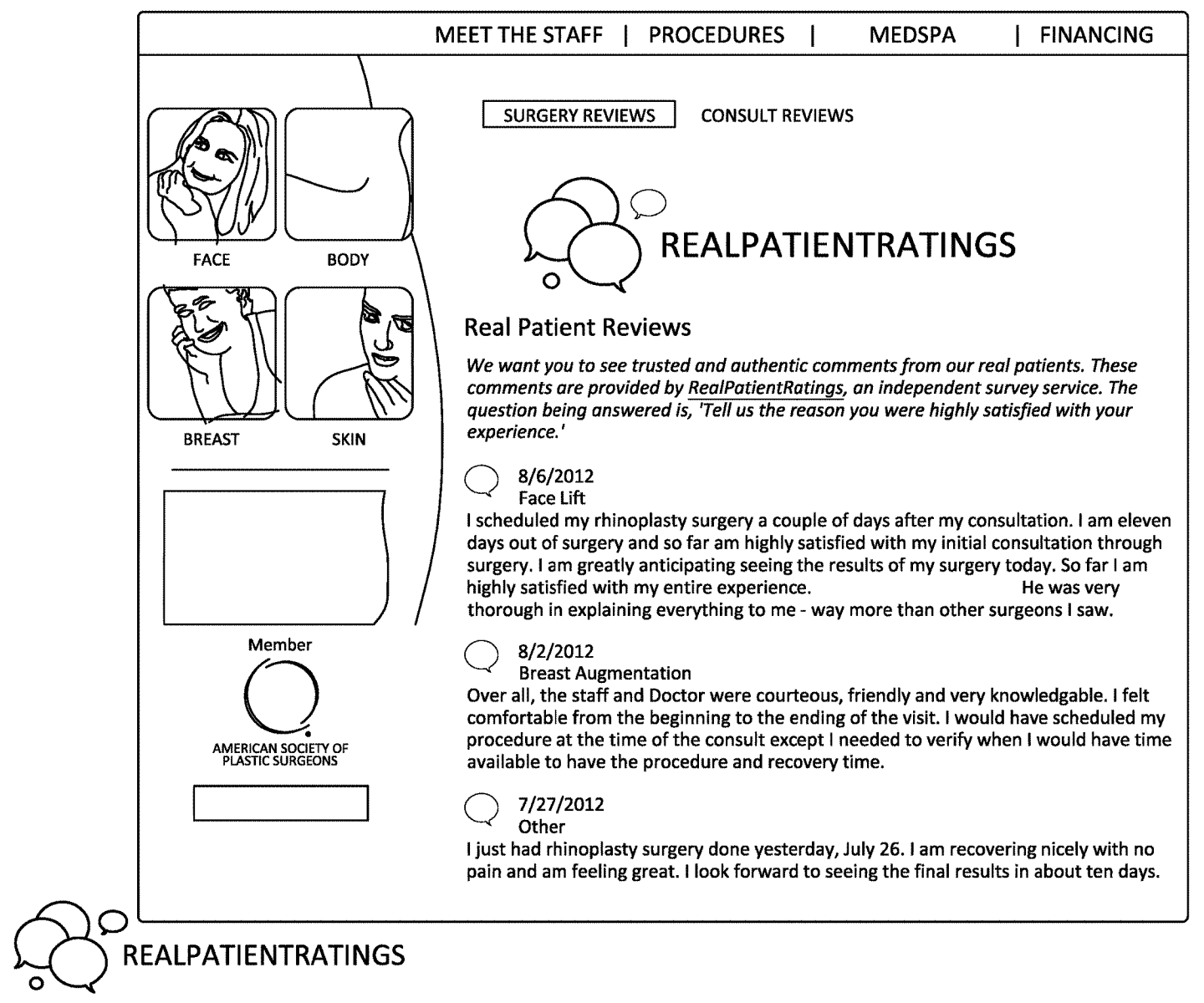
Figure 14:

FIG. 11 is a screenshot for the patient once the survey is completed. FIG. 12 is a screenshot, or alternatively an email, which is displayed to the provider indicating that a new survey including a star rating is available for this provider. FIG. 13 is a screenshot illustrating a series of reviews for a given physician as displayed by the portal computer. FIG. 14 is a screenshot illustrating a group of doctors in response to a request in accordance with the system and method of the embodiment.

Referring now to FIGS. 18 and 19, the system 10 provides a technique to rate the goods and/or services of a given provider, as well as a rating for the provider as previously described. In this regard, the system 10 is able to enable a consumer to utilize the website of the system 10 to search for reviews for specific subcategories of goods and/or services, either separate from or in addition to a search for a particular provider. While this feature may be used with the real ratings third party system 10, it is contemplated that it may also alternatively be used with other conventional types of rating systems.

According to an embodiment, the real ratings portal computer software media causes the displaying of category preference information gathering indicia, and of sub-category preference information gathering indicia on its website. Thus, both category and sub-category preference information may be received from the consumer computer software of the consumer computers and stored in the portal computer. The portal computer searches the stored survey responses in response to the stored category and sub-category preference information. The portal computer displays the stored responses corresponding to the stored category and subcategory preference information.

The category preference information may include a search for keywords found in the survey responses so that a search may be made by the portal computer of the stored survey responses. In this manner, previously stored survey responses may be searched and then displayed on the website of the portal computer for viewing by a consumer using his or her consumer computer.

The sub-category preference information may include a plurality of high level types of sub-category information and a plurality of low level types of subcategory information. The high-level sub-category preference information may include a plurality of a variety of goods and/or services information. The low level sub-category preference information may include provider information. Thus, the portal computer searches both the high-level and the low-level sub-category preference information to search for either providers or survey responses, and then to display them on the portal computer website.

Referring now to FIG. 18, there is shown a screenshot for illustrating a procedure search feature where a consumer has undertaken a search for a provider who performs the desired procedure. Both preference categories and preference sub-category information may be utilized to find certain physicians for desired procedures. FIG. 18 of the drawings illustrates the example of a consumer seeking healthcare providers who perform certain cosmetic surgery fitting the preferences of the consumer as to certain selected preference information concerning categories and sub-categories of preference information.

The website screenshot of FIG. 18 illustrates certain general category preference information indicia indicated at 201 that enable the consumer to enter his or her general category preference information. This preference information includes the doctor specialty, the location of the doctor including the city and a selection of a certain radius of the city and a keyword search. A keywords box 202 enables the consumer to enter certain keywords which may be present in stored survey responses. This enables the portal computer to do a full text search of the stored survey responses for the selected keywords and thus retrieve selected survey responses or, in this case, certain physicians which respond to the selected keywords.

As indicated at 203, certain sub-categories may be selected by the consumer. There is a high level sub-category referred to as PROCEDURE OPTIONS which may be selected by the consumer. In this regard, the PROCEDURE OPTIONS may include an Area of concern, Procedures, Technique, Brand, Product, and Surgical or Non-Surgical, as well as others (not shown). The area of concern may include loose skin, moles, pigmentation and/or others. The procedures may include facelifts, liposuction and others. The technique may include the kinds of liposuction, kinds of facelifts, breast augmentation approaches, and/or others. The brand may include the manufacturer or device brand name, which may be listed alphabetically. The product may be Skin Medica, skin care lines, retail and/or others.

The high level sub-category selections are made by making either no selection or one or more selections in each high level sub-category. Once this is completed, the consumer may then make selections in the NARROW BY: low level sub-category preference information. This may include languages, Specialty, Facility, Offers, Financial, Demographics and/or others (not shown). Either no selections or one or more selections are made in each one of these low-level subcategory preferences.

Once the selections are made, as indicated in FIG. 18, at 207, illustrations of various physicians meeting both the selected low-level and high-level subcategory preference information are retrieved and displayed to the consumer. This information may include star ratings, photographs of the physician as well as the names of the physician illustrated. Other information may also be provided, such for example, as the number of ratings and the number of reviews.

Referring now to FIG. 19, there is shown another screenshot of the portal computer website to illustrate the ability of the portal computer 12 to enable a consumer to search for survey reviews stored in the portal computer 12. In the screenshot shown in FIG. 19, it is generally similar to the screenshot of FIG. 18.

A generalized category preference information gathering indicia 209 is similar to the generalized category indicia 201 of the screenshot illustrated in FIG. 18. Also, similar to the website screenshot illustrated in FIG. 18, is provided a PROCEDURE OPTIONS high level sub-category preference information gathering indicia 212 and a NARROW BY low-level sub-category preference information gathering indicia 214. In the present example as indicated in FIG. 19, a consumer using a consumer computer can select Cosmetic as the general category, and then select highest rating under a "Sort by" category to cause a search of the previously stored survey reviews for this category and sub-category. As indicated at 216, all those stored survey reviews responding to the selected category and sub-category are then retrieved and displayed to the consumer. The information displayed may also include a star rating as well as the date of the review.

Referring now to FIG. 20, there is shown a screenshot of the portal computer website similar to the screenshot of FIG. 19, but adding a keyword to the selections by the consumer in the generalized indicia 209. A keyword "emotional" is indicated in the Keywords search box 221 for searching the previously stored survey responses for that word. The result is that a full text search is conducted by the portal computer 12 of the previously stored response surveys for the word "emotional" so that the survey search includes not only the generalized search indicia Cosmetic, the selection "Highest rating" for the sub-category 212, but also for the keyword "emotional" indicated at the box 221 for the keywords generalized category. Therefore, each one of the retrieved and displayed response surveys includes the word "emotional."

While particular embodiments have been disclosed, it is to be understood that various different modifications and combinations are possible and are contemplated within the true spirit and scope of the disclosed embodiments. There is no intention, therefore, of limitations to the exact disclosure herein presented.

What is claimed is:

1. An apparatus for communicating data over a communication network, comprising:
   a computer processor configured to:
      generate a data request for data identifying a user having interacted with a provider associated with a first server and being permitted to provide data regarding the interaction with the provider, and transmit the data request to the first server via the communication network,
      receive the data identifying the user from the first server via the communication network,
      generate a communication message based at least in part on the data identifying the user, the communication message including a prompt for the user to provide the data regarding the interaction via a communication device;
      transmit the communication message to the communication device via the communication network,
      receive the data regarding the interaction from the communication device via the communication network, wherein the data regarding the interaction comprises service and/or product provider ratings,
      format the data regarding the interaction,
      generate a dynamic value associated with the provider based on the formatted data regarding the interaction,
      receive additional data regarding other interactions with the provider,
      change the dynamic value based on the additional data regarding other interactions with the provider and in response to the additional data regarding other interactions being received, store the dynamic value for display via a second server, and publish the dynamic value in response to changes to the dynamic value.

2. The apparatus of claim 1, wherein the dynamic value does not include responses received from communication devices of other users whose data was not received in the response to the request, and wherein the service and/or product provider decides whether or not to publish one or more of the user data ratings.

3. The apparatus of claim 1, wherein the data regarding the interaction includes one or more of details of the interaction between the user and the provider associated with the first server and an indication of whether or not the user would utilize the provider in the future.

4. The apparatus of claim 1, wherein the dynamic value measures the interaction between the user and the provider.

5. The apparatus of claim 1, wherein the computer processor is further configured to compare the dynamic value associated with the provider with another dynamic value associated with another provider based on one or more of a geographic area or an associated category associated with the provider and the other provider.

6. The apparatus of claim 1, wherein the data request includes a data inquiry for data identifying all users who have had interactions with the provider within a given period of time.

7. The apparatus of claim 1, wherein the data regarding the interaction comprises an indicator indicating that the user permits the data regarding the interaction to be published anonymously.

8. The apparatus of claim 1, wherein the computer processor is further configured to extract information from the data regarding the interaction and generate a text field for publication by the second server based on the extracted information, the generated text field being associated with one or more of details of the user and details of the provider.

9. The apparatus of claim 8, wherein the computer processor is further configured to search generated text fields from a plurality of users based on at least one of the associated details of the user and text contained in the generated text fields.

10. The apparatus of claim 9, wherein the computer processor is further configured to generate a report for transmission to the provider, the report including one or more of the dynamic value and the generated text fields associated with the provider.

11. A method for communicating data over a communication network, comprising:

generating, via a computer processor, a data request for data identifying a user having interacted with a provider associated with a first server and being permitted to provide data regarding the interaction with the provider;

transmitting, via a communication circuit, the data request to the first server via the communication network;

receiving, via the communication circuit, the data identifying the user from the first server via the communication network;

generating a communication message based at least in part on the data identifying the user, the communication message including a prompt for the user to provide the data regarding the interaction via a communication device;

transmitting, via the communication circuit, the communication message to the communication device via the communication network;

receiving, via the communication circuit, the data regarding the interaction from the communication device via the communication network, wherein the data regarding the interaction comprises service and/or product provider ratings;

storing, in a memory circuit, the data regarding the interaction;

formatting, via the computer processor, the data regarding the interaction;

generating, via the computer processor, a dynamic value associated with the provider based on the formatted data regarding the interaction, receiving additional data regarding other interactions with the provider, changing the dynamic value based on the additional data regarding other interactions with the provider and in response to the additional data regarding other interactions being received, storing, in the memory circuit, the dynamic value for display via a second server, and publishing the dynamic value in response to changes to the dynamic value.

12. The method of claim 11, wherein the dynamic value does not include responses received from communication devices of other users whose data was not received in the response to the request, and wherein the service and/or product provider decides whether or not to publish one or more of the user data ratings.

13. The method of claim 11, wherein the data regarding the interaction includes one or more of details of the interaction between the user and the provider associated with the first server and an indication of whether or not the user would utilize the provider in the future.

14. The method of claim 11, further comprising extracting, via the computer processor, information from the data regarding the interaction and generate a text field for publication by at least one server based on the information extracted from the data regarding the interaction, the generated text field being associated with one or more of details of the user and details of the provider.

15. The method of claim 14, further comprising generating, via the computer processor, a report for transmission to the provider, the report including one or more of the dynamic value and the generated text fields associated with the provider, and transmitting, via the communication circuit, the report to the provider.

16. The method of claim 11, wherein the user data rating is excluded from publication if the service or product provider decides not to publish such user data rating.

17. The method of claim 11 wherein the service provider ratings comprise ratings for one or more procedures performed by the provider.

18. The method of claim 11, wherein the service provider ratings comprise ratings for one or more procedures performed by the provider.

19. A non-transitory computer-readable medium storing computer program instructions which, when executed by at least one processor, cause the at least one processor to:

generate a data request for data identifying a user having interacted with a provider associated with a first server and being permitted to provide data regarding the interaction with the provider, transmit the data request to the first server via the communication network, receive the data identifying the user from the first server via the communication network, generate a communication message based at least in part on the data identifying the user, the communication message including a prompt for the user to provide the data regarding the interaction via a communication device;

transmit the communication message to the communication device via the communication network, receive the data regarding the interaction from the communication device via the communication network, wherein the data regarding the interaction comprises service and/or product provider ratings, format the data regarding the interaction, generate a dynamic value associated with the provider based on the formatted data regarding the interaction, receive additional data regarding other interactions with the provider, change the dynamic value based on the additional data regarding other interactions with the provider and in response to the additional data regarding other interactions being received, store the dynamic value for display via a second server, and publish the dynamic value in response to changes to the dynamic value.

20. The non-transitory computer-readable medium of claim 19, wherein the service or product provider decides whether or not to publish one or more of the user data ratings.

* * * * *